United States Patent [19]
Lee et al.

[11] Patent Number: 6,064,856
[45] Date of Patent: May 16, 2000

[54] MASTER WORKSTATION WHICH COMMUNICATES WITH A PLURALITY OF SLAVE WORKSTATIONS IN AN EDUCATIONAL SYSTEM

[76] Inventors: John R. Lee, 912 Constantinople St., New Orleans, La. 70115; John Alvendia, 1721 Field Ave., Metaire, La. 70001

[21] Appl. No.: 09/045,818

[22] Filed: Mar. 23, 1998

Related U.S. Application Data

[60] Division of application No. 08/482,397, Jun. 7, 1995, Pat. No. 5,788,508, which is a continuation-in-part of application No. 08/161,811, Dec. 6, 1993, Pat. No. 5,441,415, which is a continuation-in-part of application No. 07/833,905, Feb. 11, 1992, Pat. No. 5,267,865.

[51] Int. Cl.$^7$ ...................................................... G09B 3/00
[52] U.S. Cl. .......................... 434/350; 434/118; 434/323; 345/346
[58] Field of Search ................................... 434/118, 169, 434/201, 307 R, 178, 185, 308, 322, 323, 335–337, 350, 362, 365; 705/7, 14; 706/927; 340/825.51, 825.5; 345/146, 326, 329, 336, 357, 978, 346, 349, 335; 463/1, 40; 273/429–431; 370/85.13, 85.14, 94.1, 94.3, 124; 707/103; 709/303

[56] References Cited

U.S. PATENT DOCUMENTS

| | | |
|---|---|---|
| 4,798,543 | 1/1989 | Spiece . |
| 4,820,167 | 4/1989 | Nobles et al. . |
| 4,867,685 | 9/1989 | Brush et al. ............................. 434/234 |
| 4,891,633 | 1/1990 | Imazeki et al. . |
| 4,968,257 | 11/1990 | Yalen . |
| 5,002,491 | 3/1991 | Abrahamson et al. . |
| 5,033,969 | 7/1991 | Kamimura . |
| 5,035,625 | 7/1991 | Munson et al. . |
| 5,065,345 | 11/1991 | Knowles et al. . |
| 5,109,482 | 4/1992 | Bohrman . |
| 5,147,205 | 9/1992 | Gross et al. . |
| 5,170,362 | 12/1992 | Greenberg et al. . |
| 5,176,520 | 1/1993 | Hamilton . |
| 5,261,823 | 11/1993 | Kurokawa . |
| 5,267,865 | 12/1993 | Lee et al. . |
| 5,297,249 | 3/1994 | Bernstein et al. . |
| 5,302,132 | 4/1994 | Corder . |
| 5,306,154 | 4/1994 | Ujita et al. . |
| 5,310,349 | 5/1994 | Daniels et al. . |
| 5,318,450 | 6/1994 | Carver . |
| 5,326,270 | 7/1994 | Ostby et al. . |
| 5,372,507 | 12/1994 | Goleh . |

(List continued on next page.)

FOREIGN PATENT DOCUMENTS

| | | |
|---|---|---|
| 474 160 | 3/1992 | European Pat. Off. . |
| 9100838 | 12/1992 | Netherlands . |
| WO90/05350 | 5/1990 | WIPO . |

OTHER PUBLICATIONS

Supplementary European Search Report re EP 93 90 5890 Date of Completion of search: Sep. 29, 1995.
"PS/2 MultiMedia for Microscopic Studies", IBM, 1991.
"Educational Local Area Network and Tools (EdLAN)", IBM, 1991.
"IBM personal Science Laboratory (PSL)", IBM Tools for Education, IBM, 1990.
IBM software for Education Catalog, 1991/92 Edition.
"Discover the New World of Effective Instructional Multimeia", Special Issue, IBM Multimedia, Supplement to T.H.E. Journal, Sep. 1991.

*Primary Examiner*—Joe H. Cheng
*Attorney, Agent, or Firm*—Burns, Doane, Swecker & Matthis, LLP

[57] ABSTRACT

An educational method and system for executing the method, to improve the efficiency of individual learning by monitoring the student's progress and pacing the course material to the student's ability to comprehend and learn. This method and system also reduces the teachers's administrative and paperwork burden. Interactive multimedia technology is combined with unique courseware development to provide a flexible teaching tool and student monitoring system.

30 Claims, 16 Drawing Sheets

U.S. PATENT DOCUMENTS

| | | |
|---|---|---|
| 5,385,475 | 1/1995 | Sudman et al. . |
| 5,395,243 | 3/1995 | Lubin et al. . |
| 5,513,994 | 5/1996 | Kershaw et al. . |
| 5,601,432 | 2/1997 | Bergman .............................. 434/365 X |
| 5,788,508 | 8/1998 | Lee et al. . |
| 5,797,754 | 8/1998 | Griswold et al. ........................ 434/322 |
| 5,820,386 | 10/1998 | Sheppard, II ........................... 434/322 |
| 5,823,789 | 10/1998 | Jay et al. ............................ 434/322 X |

Add or Change a Student

Choose a student name from the box below or click
the New Student button to add a student

[ Alvendia ▲▼ ]  [ New Student ]

Student Name  [Alvendia], [John]    [Alexus]
              Last Name  First Name  Middle Name Logon Name    [alvendia]  Period [5 ▲▼]    Disciplinary record
Preferred Name [Johnny]   Gender [M ▲▼]    [Used logon names]
Soc.Sec.No.   [         ]                   alvendia ▲
                                             anderson
                                             andrews  ▼

Birthday      [   ]  Parent/Guardian [                    ]
Home Phone    [   ]  Home Address    [          ] [ , LA ]
Work Phone    [   ]                                [     ]

[ Done ]

Enter students last name

FIGURE 8

Lesson Maintenance Menu

- Set Lesson Order
- Set Chapter Test Locations
- Set Lesson Mastery Grades
- Set Maximum Quiz Time
- Edit Homework Assignments
- Print Lesson Information return to main menu

FIGURE 9

Set Lesson Order

| Lesson | | Lesson Order |
|---|---|---|
| 5,15,16 | Squaring a binomial and finding the product of a sum and difference | 1 |
| 6.1.6.2 | Writing a number in prime factorization & finding the greatest common f | 2 |
| 6.3 | Factoring the greatest common monomial factor from a polynomial | 3 |
| 6.4a | Factoring the difference between two square and perfect trinomial squar | 4 |
| 6.4b | Factoring $x^2+bx+c$ when c is greater than 0 | 5 |
| 6.4c | Factoring $x^2+bx+c$ when c is less than 0 | 6 |
| 6.4d | Factoring $x^2+bx+c$ | 7 |
| 6.5 | Factoring by removing a common binomial factor & then grouping the te | 8 |
| 6.6 | Factoring a polynomial completely | 9 |
| 6.7 | Solving polynomial equations by factoring | 10 |
| 6.8 | The practical use of polynomial equations | 11 |
| 7.1 | Defining a rational expression and determining the restricted values | 12 |
| 7.2 | Simplifying rational expressions | 13 |
| 7.3 | Multiplying rational expressions | 14 |
| 7.4 | Dividing rational expressions | 15 |
| 7.5,7.6 | Finding the LCD of rational expr. & changing fractions to equivelent fract | 16 |
| 7.7 | Adding and subtracting rational expressions | 17 |
| 7.8 | Adding and subtracting polynomial and rational expressions | 18 |
| 7.9 | Simplifying complex fractions | 19 |
| 7.10 | Dividing polynomials | |

Instructions
Number the lessons you wish to be taught
sequentially starting with 1. Be sure not to repeat
a number or else an error will occur.

[Done]  Enter the lesson order

Chapter Test Locations

| Lesson Order | Lesson Name | Description | Test number | Test after this lesson | Exclude from test |
|---|---|---|---|---|---|
| 1 | 6.1,6.2 | Writing a number in prime factorization & finding the gr | 1 | ☐ | ☐ |
| 2 | 6.3 | Factoring the greatest common monomial factor from a | 1 | ☐ | ☐ |
| 3 | 6.4a | Factoring the difference between two square and perfc | 1 | ☐ | ☐ |
| 4 | 6.4b | Factoring $x^2+bx+c$ when c is greater than 0 | 1 | ☐ | ☐ |
| 5 | 6.4c | Factoring $x^2+bx+c$ when c is less than 0 | 1 | ☐ | ☐ |
| 6 | 6.4d | Factoring $x^2+bx+c$ | 1 | ☐ | ☐ |
| 7 | 6.5 | Factoring by removing a common binomial factor & the | 1 | ☐ | ☐ |
| 8 | 6.6 | Factoring a polynomial completely | 1 | ☐ | ☐ |
| 9 | 6.7 | Solving polynomial equations by factoring | 1 | ☐ | ☐ |
| 10 | 6.8 | The practical use of polynomial equations | 1 | ☒ | ☐ |
| 11 | 7.1 | Defining a rational expression and determining the rest | 2 | ☐ | ☐ |
| 12 | 7.2 | Simplifying rational expressions | 2 | ☐ | ☐ |
| 13 | 7.3 | Multiplying rational expressions | 2 | ☐ | ☐ |
| 14 | 7.4 | Dividing rational expressions | 2 | ☐ | ☐ |
| 15 | 7.5,7.6 | Finding the LCD of rational expr. & changing fractions t | 2 | ☐ | ☐ |
| 16 | 7.7 | Adding and subtracting rational expressions | 2 | ☐ | ☐ |
| 17 | 7.8 | Adding and subtracting polynomials and rational expre | 2 | ☐ | ☐ |
| 18 | 7.9 | Simplifying complex fracions | 2 | ☐ | ☐ |
| 19 | 7.10 | Dividing polynomials | 2 | ☐ | ☐ |
| 20 | 7.11,12 | Expressing ratios in simplest forms & solving equation | 2 | ☐ | ☐ |
| 21 | 7.13 | Solving rational equations | 2 | ☒ | ☐ |
| 22 | 8.1 | Graphing ordered pairs of numbers | 3 | ☐ | ☐ |

Set Lesson Order [ ]   [Done]

Check this box to generate a chapter test after this lesson

Mastery Grade Setup

Select Objective: [1] [2] [3] [4] [5] [6] [7] [8] [9] [10] [11] [12] [13] [All]

| Lesson | Description | Grade |
|---|---|---|
| 1.0 | Order of Operations | 100 |
| 1.1 | Evaluating algebraic expressions | 100 |
| 1.2 | Writing algebraic expressions for word phrases | 100 |
| 1.3 | Graphing real numbers using a number line | 100 |
| 1.4 | Classifying numbers into subsets of real numbers | 100 |
| 1.5 | Comparing and ordering real numbers | 100 |
| 1.6 | Using opposites and absolute values | 100 |
| 1.7a | Adding real numbers on a number line | 100 |
| 1.7b,c | The addition rule of real numbers | 100 |
| 1.8 | Subtracting real numbers | 100 |
| 1.9 | Multiplying real numbers | 100 |
| 1.10 | Dividing of real numbers | 100 |
| 2.1a | Evaluating expressions using the order of operations | 100 |
| 2.1b | Evaluating expressions containing exponents | 100 |
| 2.1c | Evaluate formulas for given values of the variables | 100 |
| 2.1d | Simplifying algebraic expressions by combining like terms | 100 |
| 2.1e | Simplifying and evaluating algebraic expressions containing grouping symbol | 100 |
| 2.2a-d | Simplifying expressions using the property of real numbers | 100 |
| 2.2e | Simplifying expressions using the property of $-1$ | 100 |
| 2.3 | Translating a word phrase to algebraic expression | 100 |

[Done]

Set the grade required on the quiz to proceed to the next lesson

FIGURE 12

Maximum Quiz Time

Select Objective: [1] [2] [3] [4] [5] [6] [7] [8] [9] [10] [11] [12] [13] [All]

| Lesson | Description | Time (in minutes) |
|---|---|---|
| 1.0 | Order of Operations | 30 |
| 1.1 | Evaluating algebraic expressions | 30 |
| 1.2 | Writing algebraic expressions for word phrases | 30 |
| 1.3 | Graphing real numbers using a number line | 30 |
| 1.4 | Classifying numbers into subsets of real numbers | 30 |
| 1.5 | Comparing and ordering real numbers | 30 |
| 1.6 | Using opposites and absolute values | 30 |
| 1.7a | Adding real numbers on a number line | 30 |
| 1.7b,c | The addition rule of real numbers | 30 |
| 1.8 | Subtracting real numbers | 30 |
| 1.9 | Multiplying real numbers | 30 |
| 1.10 | Dividing of real numbers | 30 |
| 2.1a | Evaluating expressions using the order of operations | 30 |
| 2.1b | Evaluating expressions containing exponents | 30 |
| 2.1c | Evaluate formulas for given values of the variables | 30 |
| 2.1d | Simplifying algebraic expressions by combining like terms | 30 |
| 2.1e | Simplifying and evaluating algebraic expressions containing grouping sym | 30 |
| 2.2a–d | Simplifying expressions using the property of real numbers | 30 |
| 2.2e | Simplifying expressions using the property of −1 | 30 |

[Done]

Set the maximum time a student may spend in the quiz

FIGURE 13

Homework Editor

Choose a lesson [ ⇧ ] Lesson Order [ 7 ]    [ Done ]

Description [ 6.5 ] [ Factoring by removing a common binomial factor & then grouping the terms ]

Pretest Assignment: [ p.287/14,16,18 ]

Lesson Assignment: [ p.294/1–13 odd; 14–30 even; 31–41 odd ]

Review Assignment: [ ]

Quiz Assignment: [ ]

Final Assignment: [ ]

Enter the desired homework assignment

| | Period 1 | | | | | Grades For Test | | | | | | 1 | | | | | Test |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | |
| Brinson, Jr. James | 100 | 100 | 100 | 100 | 100 | 100 | 100 | 100 | 100 | 100 | | | | | | | |
| Brion, Brana | 100 | 100 | 100 | 100 | 100 | 75 | 75 | 80 | 100 | 100 | | | | | | | |
| Brousseau, Kristen | 100 | 100 | 100 | 100 | 100 | 75 | 100 | 100 | | | | | | | | | |
| Cains, Latoya | 100 | 100 | 100 | 100 | 100 | 100 | 75 | 100 | 100 | 100 | | | | | | | 72 |
| Cassimere, Jr. James | 100 | 87 | 100 | 75 | 100 | 100 | 75 | 60 | | | | | | | | | |
| Celestine, Cyril | 100 | 100 | 100 | 100 | | 100 | 75 | 100 | 80 | | | | | | | | |
| Crosby, Jamie | 100 | 100 | 100 | 100 | 100 | 100 | 75 | 80 | 80 | 100 | | | | | | | |
| Davis, Areka | 100 | 100 | 100 | | | 25 | 100 | 80 | 100 | 100 | | | | | | | |
| Delandro, Trelles | 100 | 100 | 100 | 100 | 12 | 100 | 100 | 80 | 80 | | | | | | | | 32 |
| Earin, Eugenique | 100 | 100 | 100 | 100 | 100 | 100 | | 80 | 80 | 100 | | | | | | | |
| Ford, Jerome | 100 | 100 | 100 | 100 | 100 | 75 | 100 | 80 | 100 | 66 | | | | | | | 36 |
| Fortune, Chanelle | 100 | 100 | 100 | 100 | 100 | 100 | | | 100 | 100 | | | | | | | |
| Francis, Jovonda | 100 | 100 | 60 | | | | 100 | 75 | | | | | | | | | |

| 100 | 1 attempt | ▓ not mastered – 1 attempt so far |
| 100 | 2 attempts | ▨ not mastered – 2 attempts so far |
| 100 | 3+ attempts | ▧ not mastered – 3+ attempts so far |

100 bypassed lesson

Refresh Grades

Done

Form View

MASTER WORKSTATION WHICH COMMUNICATES WITH A PLURALITY OF SLAVE WORKSTATIONS IN AN EDUCATIONAL SYSTEM

RELATED APPLICATIONS

This application is a divisional of U.S. patent application Ser. No. 08/482,397, filed Jun. 7, 1995, now U.S. Pat. No. 5,788,508, which is a continuation-in-part of U.S. patent application Ser. No. 08/161,811, filed on Dec. 6, 1993, now U.S. Pat. No. 5,441,415, which is a continuation-in-part of U.S. patent application Ser. No. 07/833,905, filed on Feb. 11, 1992, now U.S. Pat. No. 5,267,865.

BACKGROUND

The present invention relates generally to educational methods at the classroom and individual level, as well as systems for implementing such methods. More particularly, the present invention relates to an educational method which combines audio-visual and computer technology to shift the teacher's role away from mass pupil instruction and paperwork and back to the more traditional role of helping each individual student with his or her unique educational difficulties.

Classroom teaching methods have changed very little since the early days of our country. The bedrock of education remains the teacher or professor lecturing to groups of students, commonly in conjunction with a text. Homework is assigned to reinforce the lessons learned in class and tests are administered to measure students' aptitude and retention of the material. At the early levels of education, the setting for this instruction has and continues to be the schoolroom, public or private, where a teacher is responsible for a group of, for example, fifteen to forty students.

The conventional classroom method of teaching a subject typically involves a lesson plan which includes a plurality of lectures each having an associated written homework assignment for the student to reinforce the lecture. The teacher collects and evaluates the homework and occasionally gives tests to measure the students' retention of the material. The teacher is also required to perform a multitude of other subsidiary tasks, such as report card generation and parent-teacher conferences, to keep the community satisfied with both the students' and the teacher's performance. Thus under the conventional classroom scenario, teachers must split their time to assume the roles of administrator and public relation officer, as well their supposedly primary role of teacher.

Educators have long recognized that while the classroom scenario provides economies of scale, one drawback is that students of different ages and aptitudes learn at differing rates and with the need for varying amounts of individual attention. This recognition led to the availability of private tutoring, for those who could afford such, provides more flexibility to meet an individual student's needs. On the other hand, private tutoring has also been criticized since it does not provide the student with the opportunity to develop social skills which is inherent in the classroom setting.

Although this traditional method of education has changed little over the years, the amount of information which students need to assimilate to be considered well educated continues to increase geometrically. This fact is graphically illustrated by the technological wonders which surround us such as microcomputers, DNA mapping, videophones, etc. The increase in information puts a correspondingly greater burden on teachers to try to cram more learning into the same amount of time, which leads to an associated increase in the amount of paperwork to be handled. Moreover, as fiscal resources grow more and more scarce, teachers have been required to handle even larger groups of students resulting in even less individual attention.

Although these problems are rapidly becoming more acute, they have been acknowledged by educators for many years. Many countries have reacted by adding more days to the school year or sending children to school at an earlier age so that students have more time to acquire the additional knowledge necessary. This solution, however, will only provide short term relief since there is only a finite amount of additional learning time which can be reasonably added to students' schedules, while our knowledge base will always continue to expand. Additionally, increasing the school year further aggravates the fiscal problem of education by requiring even greater economic resources and putting greater pressure on teachers.

Educators have also experimented with alternate teaching methods, such as 30 self-study programs and videotaped lectures, to both more efficiently use teachers' time and to provide an element of individuality to a student's study program. Although these types of methods are somewhat successful at higher levels of education, they are generally ineffective at lower levels where younger students lack the discipline to teach themselves.

SUMMARY

In accordance with the present invention, an interactive educational method has an object of providing a flexible alternative to the conventional classroom educational method which will relieve the teacher of many of the non-teaching burdens discussed above, while also giving the student the opportunity to learn at his or her own pace. The teacher will no longer have the repeated paperwork chores of preparing a daily lecture, preparing and grading homework, creating and grading tests, documenting each student's progress and performance or justifying their evaluation of the student to the parents.

This will free teachers to use their primary skills of providing individual instruction to students who have difficulty with different areas of learning. In other words, the role of the teacher will revert from administrator and public relations officer back to teacher.

Another object of the present invention in accordance with preferred embodiments of this novel educational method, is to provide a interactive, audio-visual system which will encourage each student to learn at his or her own individual pace. Moreover, each student will be provided with instructional reinforcement in the form of questions and his or her performance will be monitored by the system. If a student has difficulty with a particular area, the system will alert the teacher who can then provide additional help.

BRIEF DESCRIPTION OF THE DRAWINGS

These and other advantages and objects of the invention will become more apparent from the following detailed description of the preferred embodiments when read in conjunction with the attached Figures in which:

FIGS. 6–16 depict exemplary interface screens of a teacher's workstation according to exemplary embodiments of the present invention.

DETAILED DESCRIPTION

Figure 1:
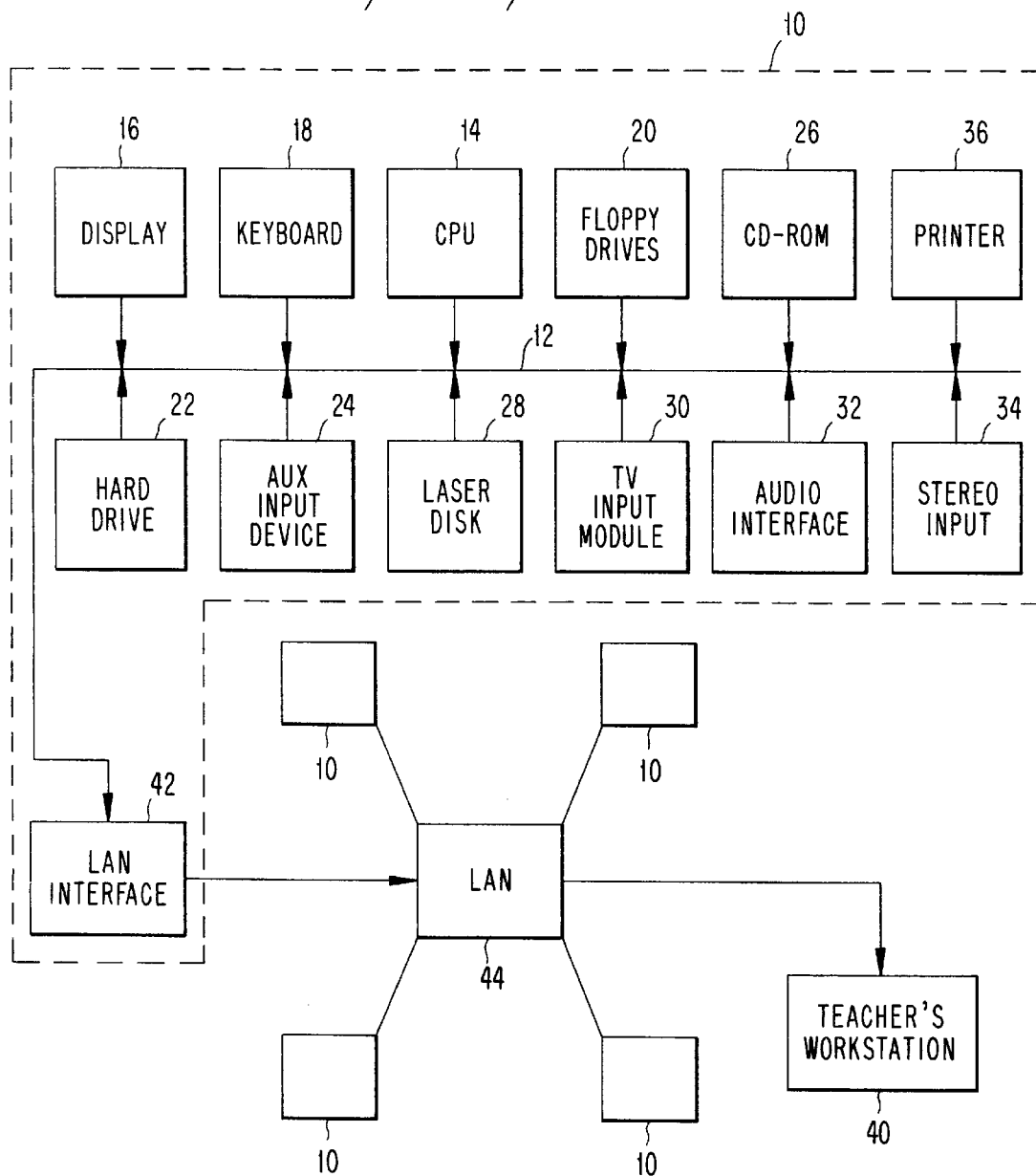
FIG. 1 illustrates a block diagram of the elements of a system for implementing the educational method according to an embodiment of the present invention.

A system for implementing the educational method according to an exemplary embodiment of the present invention will be described with reference to FIG. 1. In this exemplary embodiment it is envisioned that each student will be provided with a workstation 10 that may comprise all of the devices indicated in block form within the dotted lines of FIG. 1 linked together via system bus 12. The workstation 10 can, for example, be microcomputer and the CPU 14 could be that which is part of the microcomputer. For example, an IBM PC having an Intel 80386, 80486 or Pentium® microprocessor could provide the platform for the workstation. Alternately, more or less powerful computer systems could be used.

The workstation 10 can be integrated within or around an ergonomic environment. Each station can include an ergonomically designed chair (not shown) so that the student can remain comfortably seated for extended periods of time. The display 16, which can be a conventional VGA monitor attached via a serial port to the system bus 12, can be mounted within a student's desk under glass at about a 45 degree angle. By providing workstations having the display 16 mounted under glass, the classroom as a whole is uncluttered and the teacher is able to readily observe both students and their respective workstation displays. Alternately, the display can simply rest on the desktop. In some preferred embodiments of the invention, the display will be touch sensitive so that a student can enter data and respond to questions from the computer via the screen.

The keyboard 18, floppy drives 20, and hard drive 22 are all conventional components attached via suitable interfaces to the CPU 14. The auxiliary input device 24 can be any type of pointing device such as a mouse, digitizing tablet or light pen. The CD-ROM device 26 and laser disk 28, for providing text data and video data, respectively, are also of a conventional design and can be either built-in to the workstation or provided as stand-alone models. Full screen video presentations, or partial screen windows or video presentations, can be stored on CD or laser disk using, for example, an IMPEG compression technique.

Each of the TV input module 30, audio interface 32, and stereo input module 34 can be off-the-shelf boards which are designed to plug into the expansion slots of a microcomputer in a known manner. The TV input module 30 is a board which allows a computer to receive television signals via either antenna or cable and convert those signals into image signals which can be displayed on all or part of the display 16. The audio interface 32 is an input/output board which allows the computer to send sounds, including voice and music, to a student via headphones (not shown) which plug into the board and receive such sounds via a microphone (not shown). Alternately, the audio interface could simply be a speaker which would be connected to a sound board and/or a voice synthesizer as is well known in the art. The stereo input module 34 is a board which allows the microcomputer to receive radio transmissions or signals from a tape player, CD player or any other type of audio device, which a student could listen to as background music. Printer 36 can be any type of microcomputer compatible printer, including dot matrix, inset or laser printer, which communicates with the CPU in a known manner.

All of the student workstations are in constant communication with a teacher's workstation 40 via a LAN interface 42 and local area network (LAN) 44. As described in more detail below, this real-time communication between student workstation and teacher workstation allows the teacher to be informed of the students' progress and activities as well as allowing the teacher to tailor instructional programs for each student.

The foregoing description will be understood by one skilled in the art as merely an example of one system which could be used to implement the various embodiments of the educational method of the present invention described in detail below and that various other configurations and devices could also be used. Reference to the conventionality of the various I/O devices described above is made merely to emphasize that one skilled in the art will recognize that the system described in FIG. 1 can be implemented using known interfaces and software techniques.

Initially, one advantageous feature of the educational method according to the present invention is that courseware can be uniquely developed for each class, school, school system or any other segment of a student population so as to provide a curriculum desired by the educators using the system and method of the present invention. The term "courseware" as used throughout this specification is meant to comprise the combination of control programs and data which provide each lesson to the student at a workstation and includes, for example, both the information stored on the hard drive, laser disk, and CD-ROM, as well as that input through the TV input module, and the programmed presentation of that data. The phrase "lesson segment" is used to denote a block of material presented to a student which is intended to be viewed and interacted with in one sitting, typically 15–40 minutes. A lesson segment can also be a test which evaluates the student's retention of one or more lesson segments or a whole semester's worth of material.

As a simplified example, history courseware dealing with the American Revolution might comprise a plurality of lesson segments. One lesson segment might include, for example, a narrative story of George Washington's role in the revolution. The text of the story, read from the CD-ROM, might occupy one half of the display while illustrations, from the laser disk, occupy the other half of the screen. After each segment of the lesson, the program could test the student's comprehension by asking the student to answer a series of questions via the keyboard which relate to the previous segment of the lesson.

Thus the teacher or school system can select material including, for example, text, illustrations, length of lesson and questions to be answered, to comprise the courseware for any subject. This courseware development step in the educational method according to the present invention advantageously provides teachers and parents with the opportunity to create and update the educational material for presentation to the students.

One skilled in the teaching art will appreciate that many other teaching tools could be integrated into the courseware, in addition to those mentioned above, to present various topics. For example, some topics, such as biology, are particularly conducive to teaching via film presentation. This material can be input via the TV input module, or presented as computer video decompressed from a CD, and displayed while an accompanying voice description is listened to by the student on the headphone set.

Figure 2:
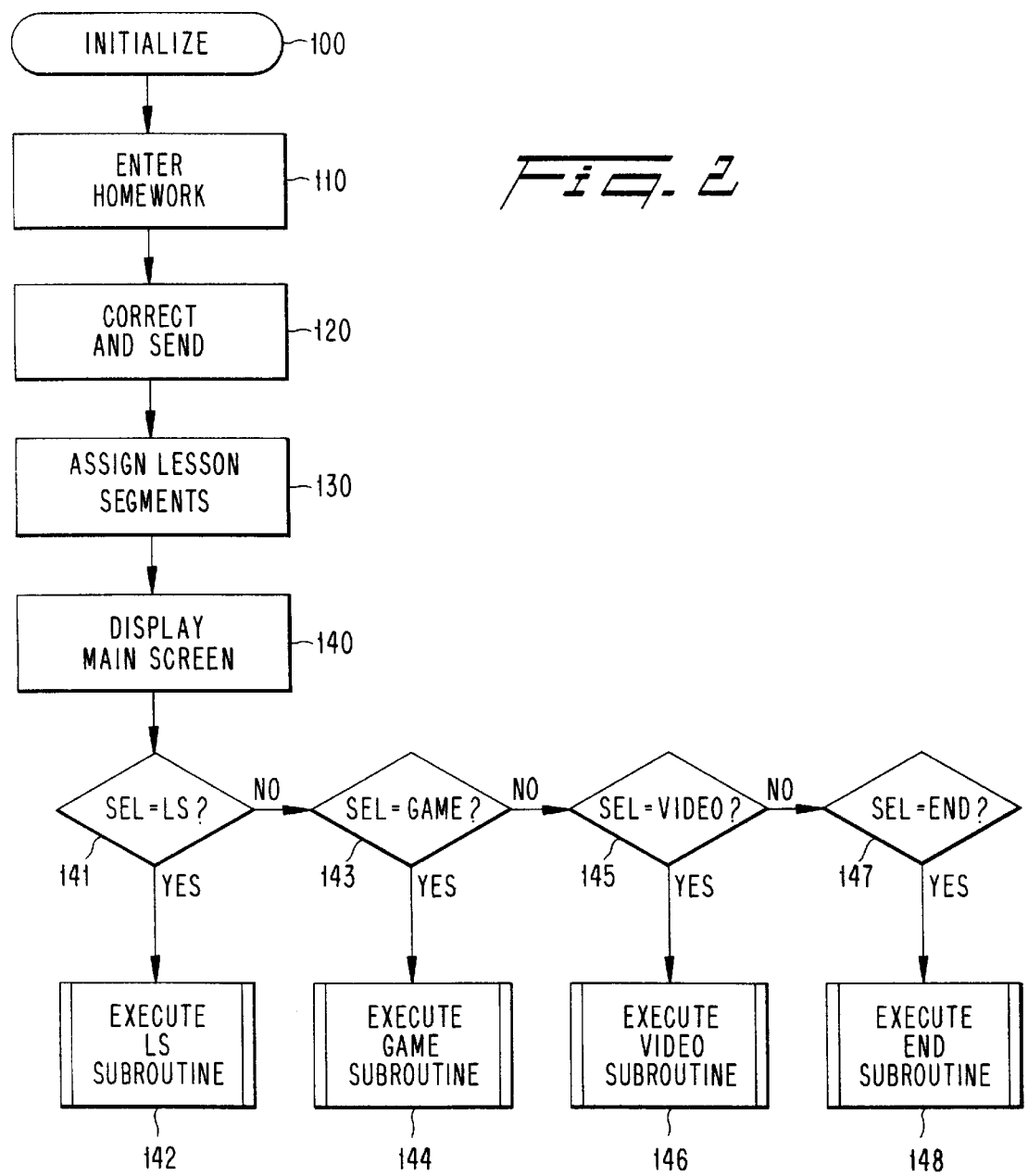
FIG. 2 sets forth a flow chart which indicates an overall sequence of events according to a preferred embodiment of an educational method according to the present invention.

Next, FIG. 2 illustrates an exemplary preferred embodiment of an overview of an educational method according to the present invention wherein the student is using the workstation and the system has been loaded with the developed courseware. In block 100, the teacher initializes the system and then the students enter their homework assignments from the previous day into the system at block 110. The homework assignment can be entered manually by the student typing the answers on the keyboard. Alternately, an optical scanning device (not shown) can be provided which is used to scan the homework paper and digitize the answers. In either case, the homework answers are compared to the expected answers by the CPU of each workstation and the results transmitted via the LAN to the teacher's workstation as indicated by block 120. The homework answers are stored in database files corresponding to each student name or ID number in the hard drive at the teacher's station for future use.

The teacher and/or a system program can then use the results of the homework assignments in conjunction with each student's progress, which has been stored in another database file at the end of the previous day, to assign lesson segments to each student as the process flow continues to block 130. Alternatively, lesson assignments can be determined solely on the basis of each student's progress and homework can be used either as a measure of retention or as a pretest. This assignment process allows the teacher and/or a system program to determine how much and what type of material each student can access for a given period of time, and provides the first of several opportunities for the teacher and/or system program to tailor each student's individual learning program.

Within the system, this assignment process is controlled by the CPU of the teacher's station which downloads the control programs corresponding to the lesson segments selected by the teacher and/or a system program from the hard drive or other storage device of the teacher's workstation to the selected student's station through the LAN. Alternately, a single control program could be downloaded to, or stored on, the students' workstations which will allow selection of lesson segments stored on the hard drive of each student's workstation. When run by the student these control programs access the various information storage devices to retrieve the audio and visual data created for each lesson segment.

In block 140, the process flow moves to the next step of displaying the main screen at each student work station. In addition to lesson segments, this screen can also include selections such as games, movies or educational video programs, and creative writing or drawing activities. These selections can also be chosen by the teacher, student, and/or a system program and can be downloaded through the LAN to each student workstation. As mentioned briefly above, depending on the educational level at which the system and method are being implemented, the student can make selections in a variety of ways. Younger students, for example, can make a selection by touching color-coded figures displayed on a touch-sensitive screen. More advanced students can make a selection by using the workstation's pointing device to click on the appropriate icon.

In decision blocks 141, 143, 145, and 147, the process flow checks to see which selection is made from the main screen. For exemplary purposes only, the choices of LESSON SEGMENT, GAME, VIDEO and END are illustrated in FIG. 2, however it is to be understood that many other different types of selections can be provided. Based on the determined selection, an appropriate subroutine 142, 144, 146, or 148 is executed. The LESSON SEGMENT selection will now be described with reference to FIG. 3 which illustrates an exemplary flowchart breaking down some of the steps of a lesson segment subroutine as diagrammatically indicated at block 142.

A control program corresponding to the selected function which was previously stored on the hard drive or other storage device of the student's workstation during the assignment process is initiated in block 152. Prior to presenting a lesson, a pretest can be performed to determine the student's current level of comprehension of a subject. If the student's comprehension is sufficiently high, then the lesson presentation may be skipped and the student can be quizzed on this topic. Otherwise, the student then watches and listens to the audio-visual presentation created by the control program as the process flow continues in block 153. For example, a series of mathematics problems may be presented on display 16 using computer-driven video of a teacher's prerecorded lesson. The control program will also provide software control options for the student such as adjustment of speed or volume of the presentation and the ability to stop and restart the presentation so that the student can take a break or ask the teacher a question as discussed below.

At decision block 154 the control program checks to see if it has presented all of the material for the lesson segment. If so, the subroutine ends and the control program goes to block 180 in FIG. 3 to execute a quizzing subprocess described below. If not, the control program polls various flag variables associated with the commands available to the student during the presentation as shown at decision block 156. If a flag has not been set, the control program loops back and continues displaying material at block 153 and then again checks if the lesson segment is over. If a flag has been set, indicating that the student wants to change or stop the presentation, the flow proceeds to a decision tree to implement the corresponding subroutine.

A first such exemplary subroutine is shown beginning at decision block 158, wherein it is asked whether the flag representing the STOP command was set. If not, the flow proceeds to the next command checking decision block 160. If the student has activated the stop command, the process flows to decision block 159 where the student is asked if he or she wishes to save the current position in the lesson segment and return to the main screen. If so, a pointer indicating a last displayed time frame in the lesson segment is stored and the process goes back to block 140 in FIG. 2. Otherwise the presentation is temporarily frozen at block 162. Next, the control program checks to see if the student has activated the restart command at decision block 164. If so, the process flow returns to block 153 and continues to display material in that loop. If not, a counter is incremented at block 166 and the count is compared, at block 168, to a predetermined number, for example, a number equal to 5 minutes, to see if the teacher should be notified of the delay. If the current number is equal to the predetermined number, a message is sent over the LAN to notify the teacher at block 170, otherwise, the process flow loops back to again check if the restart command has been given.

The SPEED and VOLUME control commands are checked for and implemented at blocks 160, 172, 174, and 178 in a similar manner. Since these functional subroutines are not themselves part of the present invention and are well known in the art, they are not described in further detail herein. Moreover, one skilled in the art will appreciate that a plurality of other commands can be made available to the student by simply adding such subroutines to the decision tree and providing icons or areas of a touch-sensitive screen which will set a flag corresponding to that function.

Figure 4:
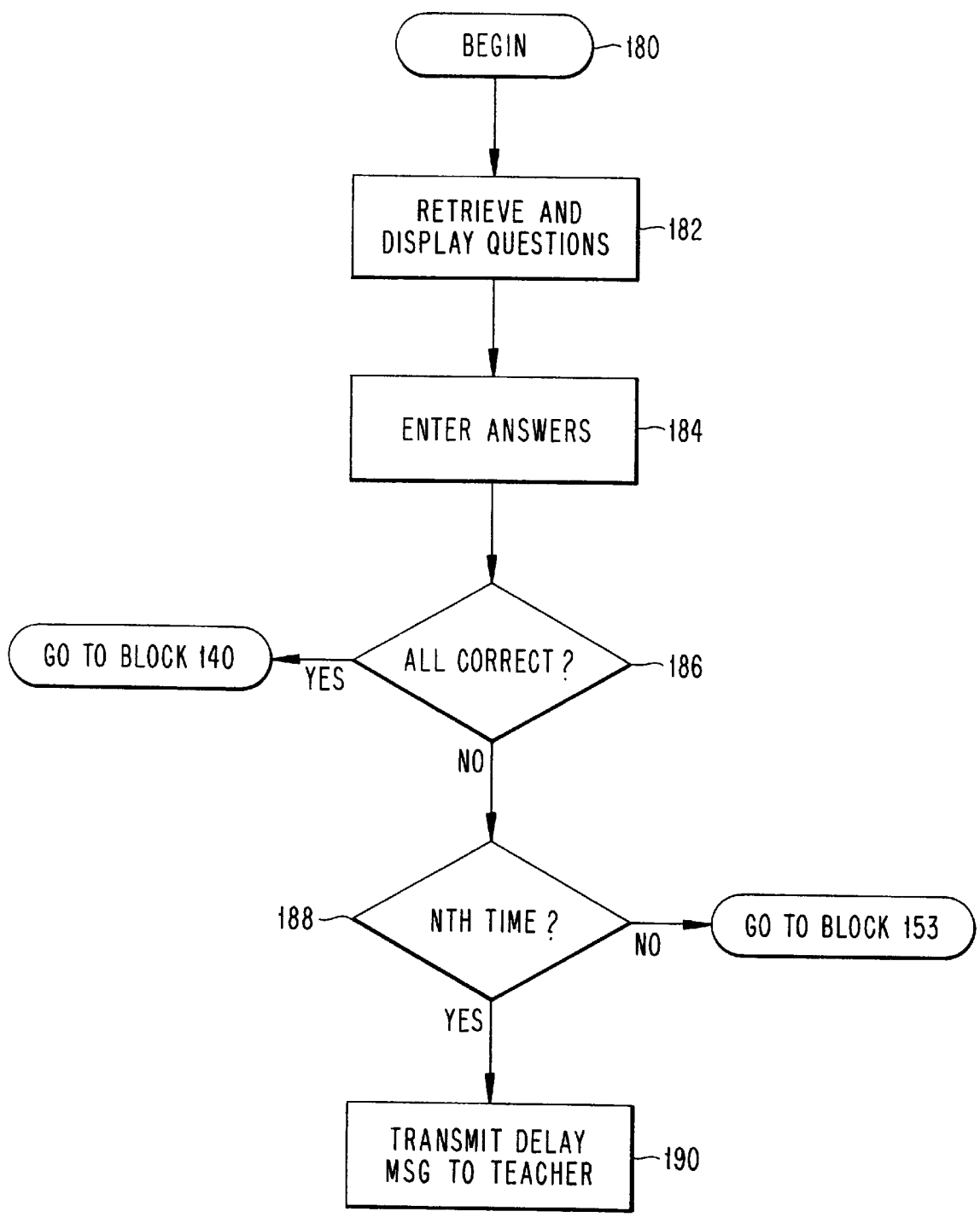
Figure 5:
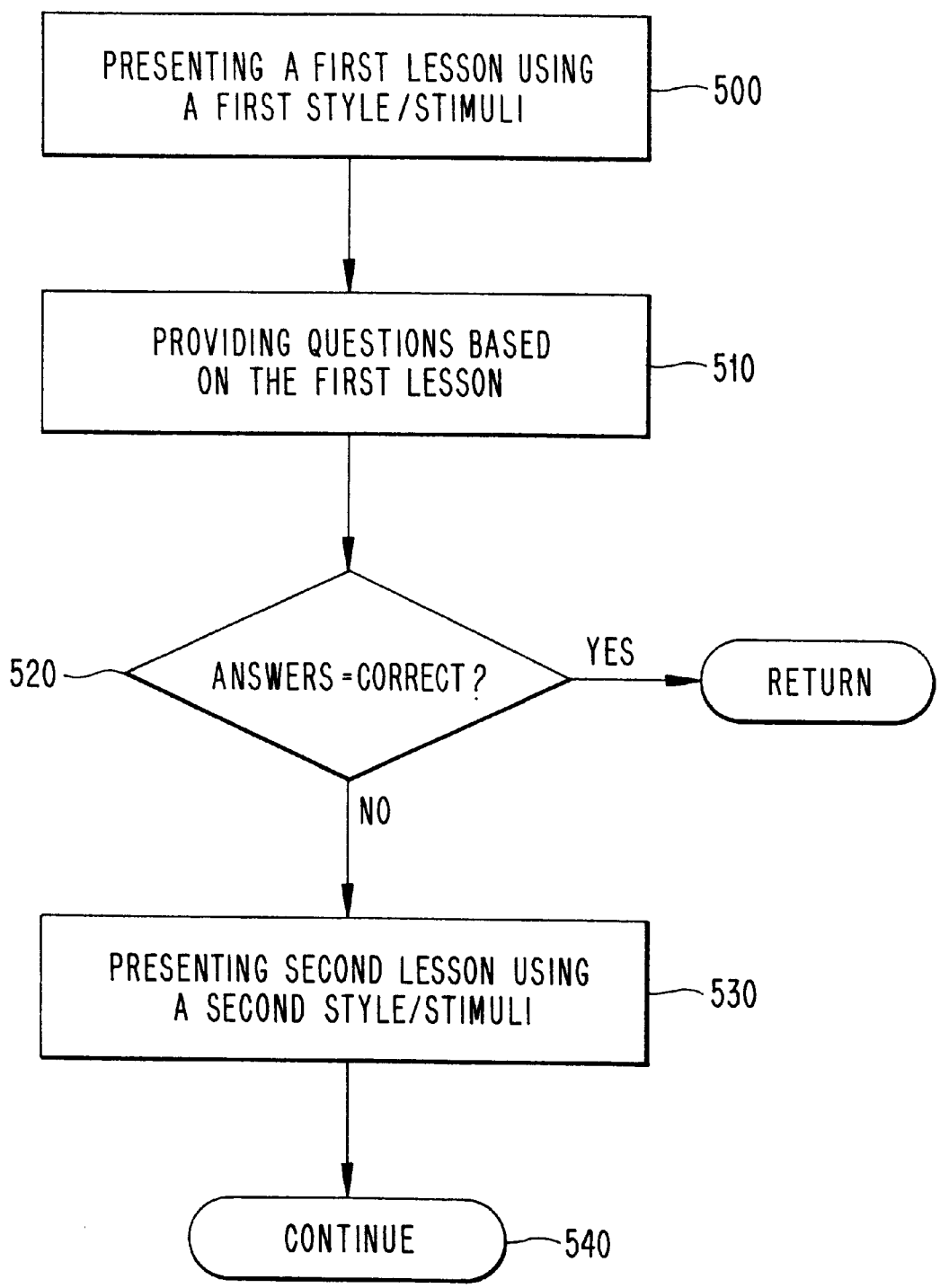
FIG. 5 is a flow chart illustrating another exemplary embodiment of the present invention.

After a lesson segment has finished being presented, the control flow according to this exemplary embodiment of the present invention goes from decision block 154 to block 180 which executes a quiz subroutine illustrated in more detail in FIG. 4. At the end of each lesson segment, which can be designed at the courseware level to be of an optimal attention span length for the intended grade level of the student, typically there will be a series of questions retrieved from a database of questions associated with the particular lesson segment for the student to answer at block 182. The student enters his or her responses via the keyboard and the workstation CPU compares these responses to the correct answers stored in the database at blocks 184 and 186. The quiz can be time limited as discussed below. If desired, a grade on the student's responses can be generated and transmitted to the teacher's station for storage in the student's file.

At decision block 186, if the student has correctly answered all of the questions the flow loops back to the main screen block 140 of FIG. 2, whereat the student can access another lesson segment, request recreational material, or end for the day. If the student has incorrectly answered some questions, the process flow loops back to block 153 of FIG. 3 and the program retrieves and replays only material relating to those questions which were missed. This replayed material could be excerpted from the original presentation or it could be new material specifically designed to explain the correct answer to each incorrectly answered question. The process of replaying this material includes all of the steps discussed above with respect to subroutine block 142 and the subroutines of FIG. 3. Alternatively, the presentation of remedial material might occur only when a student's quiz score is below a predetermined threshold.

After playing this remedial material, the same or different questions as those previously answered incorrectly will again be displayed and answered at blocks 182 and 184. The workstation CPU will again check the answers at decision block 186 and transmit the results to the teacher's station for storage. If all of the answers are correct, the process flow returns to the main screen block 140. If, however, after a predetermined number of tries the student still fails to grasp the material and answers some questions incorrectly, the process flows to block 190 and the student's workstation will send a message to the teacher's workstation indicating which material the student is having problems with. The teacher can then use his or her own methods to personally help the student to grasp the material.

According to another exemplary embodiment of the present invention, a curriculum database provides different ways of presenting the concepts contained in lesson segments. For example, the same lesson segment can correspond to plural presentations stored in the curriculum database, each of which is based on a different teaching style, format and/or media. Thus, each lesson segment will have corresponding presentations stored in the curriculum database which emphasize, for example, voice or other audio information, pictures, animation, symbolism, analogy, repetition, and combinations thereof. Of course those skilled in the art will appreciate that these are only a few of the different media and different teaching styles which can be combined to provide different presentations for a particular lesson segment.

An exemplary usage of a curriculum database according to the present invention will now be described. Suppose that a student is working on a lesson segment in Algebra that is intended to convey the relationship between the equation y=x+b and a line on a graph. The student first works with an animated presentation that illustrates how the equation y=x+1 corresponds to a line which has slope 1 and intersects the y-axis at coordinate (0,1). For whatever reason, the student does not master this topic after working with this lesson segment, this lack of mastery indicated, for example, by the quizzing subroutine of FIG. 4.

Figure 3:
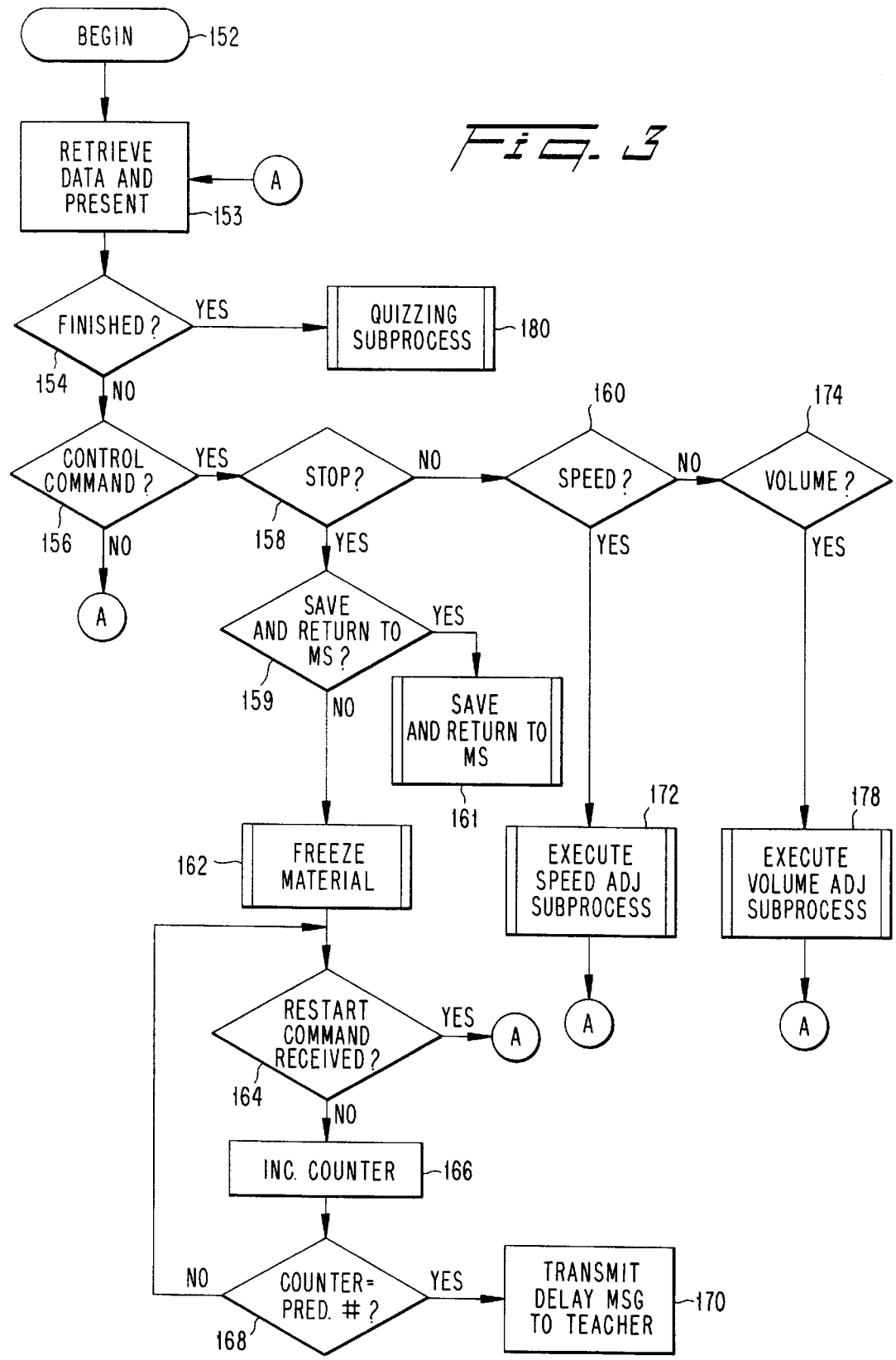
FIGS. 3 and 4 illustrate flowcharts describing subprocesses of the sequence described in FIG. 2.

The system then branches back to block 153 of FIG. 3, as earlier described, for the presentation of additional material. In this case, the additional material comprises all or part of a different presentation which corresponds to this Algebra lesson segment. For example, the system could provide a presentation which uses an audio and "hands on" approach, taking the student step-by-step through a process that asks the student to draw a graph on a piece of paper, write down the equation y=x+1 and draw in points which come from the equation. This particular student, who happens to grasp things better by actually doing them, now understands the concepts which eluded him or her after the first presentation and subsequently passes the next quizzing segment so that he or she can move on to new challenges.

Of course the foregoing is merely an example, and these presentations could have been described as being in the opposite order, the point being that different approaches to presenting the same material are provided by the curriculum database to prevent frustration on the part of the student and accelerate the learning process. Moreover, the system can learn the idiosyncracies of the individual students and present lesson segments accordingly. Thus, if for example some students grasp material more quickly based on audio presentations, their first presentation of a lesson segment can be one which has been predetermined to emphasize audio stimuli. If, on the other hand, other students react better to visual presentations, their first presentation can be one which has been predetermined to emphasize visual stimuli.

The system can learn the idiosyncracies of the students by conventional means, e.g., artificial intelligence, expert systems, simply generating statistics based on the number of questions answered correctly after working with each category of presentation type, etc. This information can be compiled and stored in the LAN 44 or the teacher's workstation 40 and used to generate a preference ranking that tailors the order of initial presentation and remedial presentations for each student. Alternately, or in combination with this automatic method, the teacher can designate this order or any part thereof for all or any number of students. The teacher can also temporarily override the presentation preferences of each student. If, for example, it is desired to test a new presentation package which has been added to the curriculum database, then the teacher could override the presentation ranking so that each student first accesses the new package for a particular lesson segment.

In addition to lesson segments, blocks 144 and 146 generally indicate game and video subroutines, respectively, which can be selected by a student from the main screen if they have been sent to the student workstation by the teacher and/or a system program. These selections can be used to reward the student or merely to provide a break from the more educational materials. Like the lesson segment function described above, the selection of these functions initiates a control program which allows the student to play a game or watch a program for a predetermined time. After the predetermined time has elapsed, the program will return the student to the main screen where only lesson segment selections will be available so that the student can complete the assigned lessons for the day. Further detail regarding particular games and video programs and their control are beyond the scope of this disclosure and can be readily implemented using conventional means. Again it should be noted that games and videos are detailed herein only as examples of other functions which can be integrated into the system and method according to the present invention and that many other selections and functions can be readily implemented by one skilled in the art.

The END function which is recognized by decision block 147 and implemented at block 148 of FIG. 2 can be selected by the student at the end of the day or as a logoff feature if other students need to use the workstation. Housekeeping software will update the database files at the teacher's station regarding the student's activity during the session being terminated. Homework for the following day corresponding to the lesson segments completed during the session can be can be retrieved from memory and generated by the printer. Additionally, progress reports or remedial notes can be generated at the printer for the student to take home to his or her parents.

The teacher's workstation 40 can comprise a system similar to that of the student workstation 10 which may be enhanced to provide sufficient processing resources to control the LAN and provide monitoring capabilities of each of the student workstations tied into the LAN. The teacher's workstation can include a more powerful CPU, larger on-board memory and a larger hard drive to store, for example, all of the various databases used to store information received from the students' workstations. In addition to the functions discussed above, the teacher's workstation also provides the teacher with other capabilities including, editing the databases associated with the materials and questions of the lesson segments and report generation features which allow the teacher to easily generate grade reports on any or all of the students. An exemplary teacher's workstation will now be described with respect to FIGS. 6–16 which show exemplary interface screens.

Figure 6:
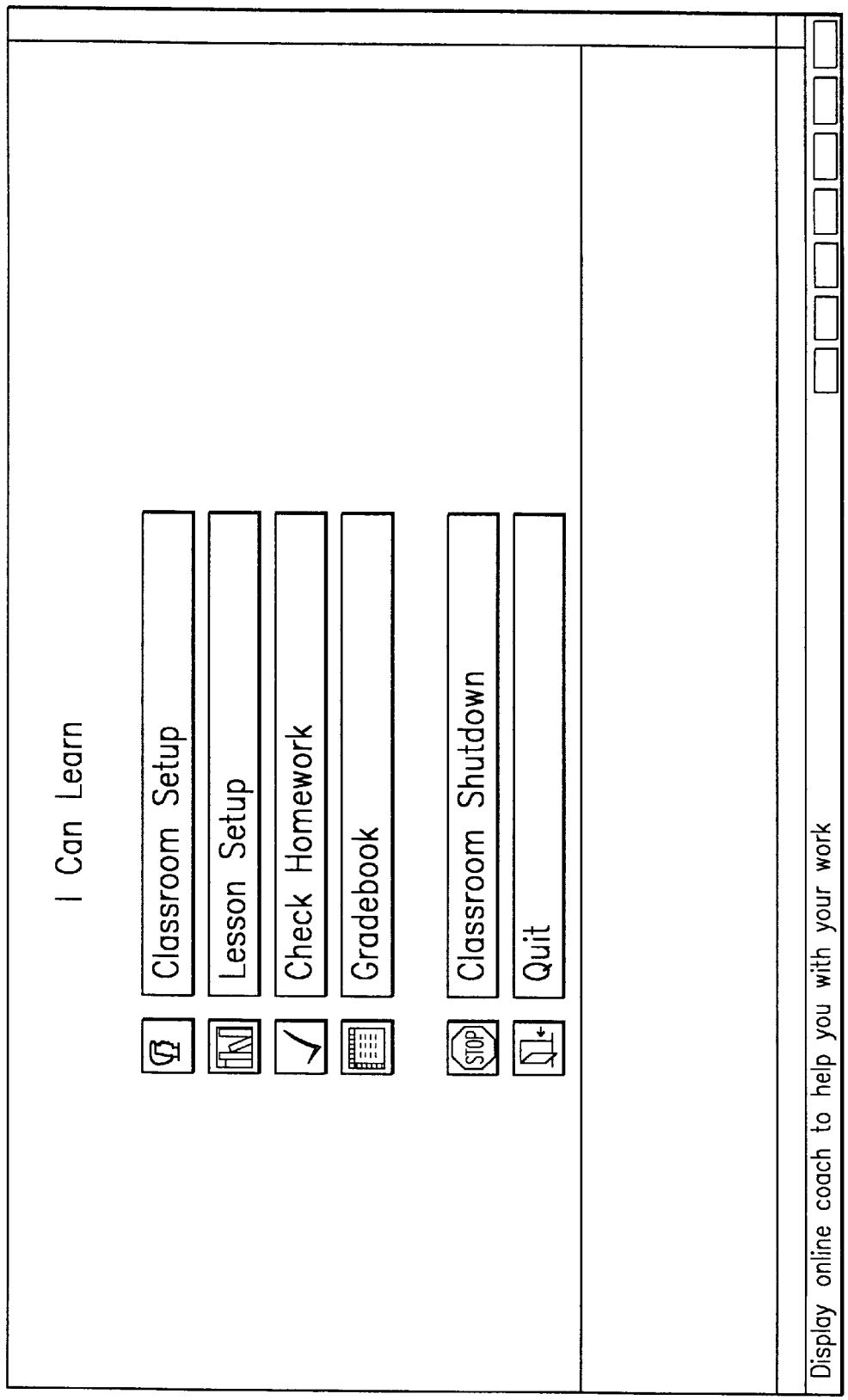
Figure 7:

FIG. 6 depicts a first menu from which a teacher may select various submenus, the classroom shutdown command or the quit command. The class shutdown command provides a way in which the teacher can signal the students' workstations that, for example, the end of a class period is approaching and that students should not be permitted to access additional lesson segments which might extend beyond the end of the classroom period. The classroom setup submenu is illustrated in FIG. 7. Therein various functions including adding or changing a student's information, deleting a student, printing the classroom lists, and printing logon names are provided. An exemplary screen for adding or changing a student appears as FIG. 8.

The lesson setup or lesson maintenance menu is illustrated as FIG. 9. Each of the first five options listed from the top of this menu have examples thereof shown FIGS. 10–14. By clicking on the print lesson information option, the teacher has the ability to capture information regarding the lessons in printed form. As can be seen in FIG. 10, each lesson segment can be presented to the students in any order desired by the teacher. For example, the teacher could change the numbers indicated in the "lesson order" column to change the order of lesson presentation based upon his or her teaching experience.

FIG. 11 shows an exemplary chapter test location menu which allows the teacher to selectively determine when quizzing will be performed relative to the presentation of the lessons. Additionally, a teacher can exclude certain lessons from the quiz as desired. FIG. 12 shows an exemplary interface which can be used for the teacher to determine what score on a quiz will allow a student to proceed to the next lesson. For example, a threshold score can be entered in the "Grade" column which will allow a student to proceed to the next lesson. Each quiz can have its own score for passing individually determined by the teacher or a universal threshold could be provided for all quizzes.

FIG. 13 displays an interface which can be used at the supervisory station to provide a maximum quiz time within which period a student must finish taking a quiz. At the end of this maximum time, the system would then evaluate the student's current responses and provide a grade or score. The homework editor screen of FIG. 14 can be used by the teacher to associate various assignments with each lesson presented by the system. Thus, at the end of a class (as indicated by the teacher shutting down the classroom) homework can be generated based upon the entries and changes made by teacher on this screen.

Figure 15:
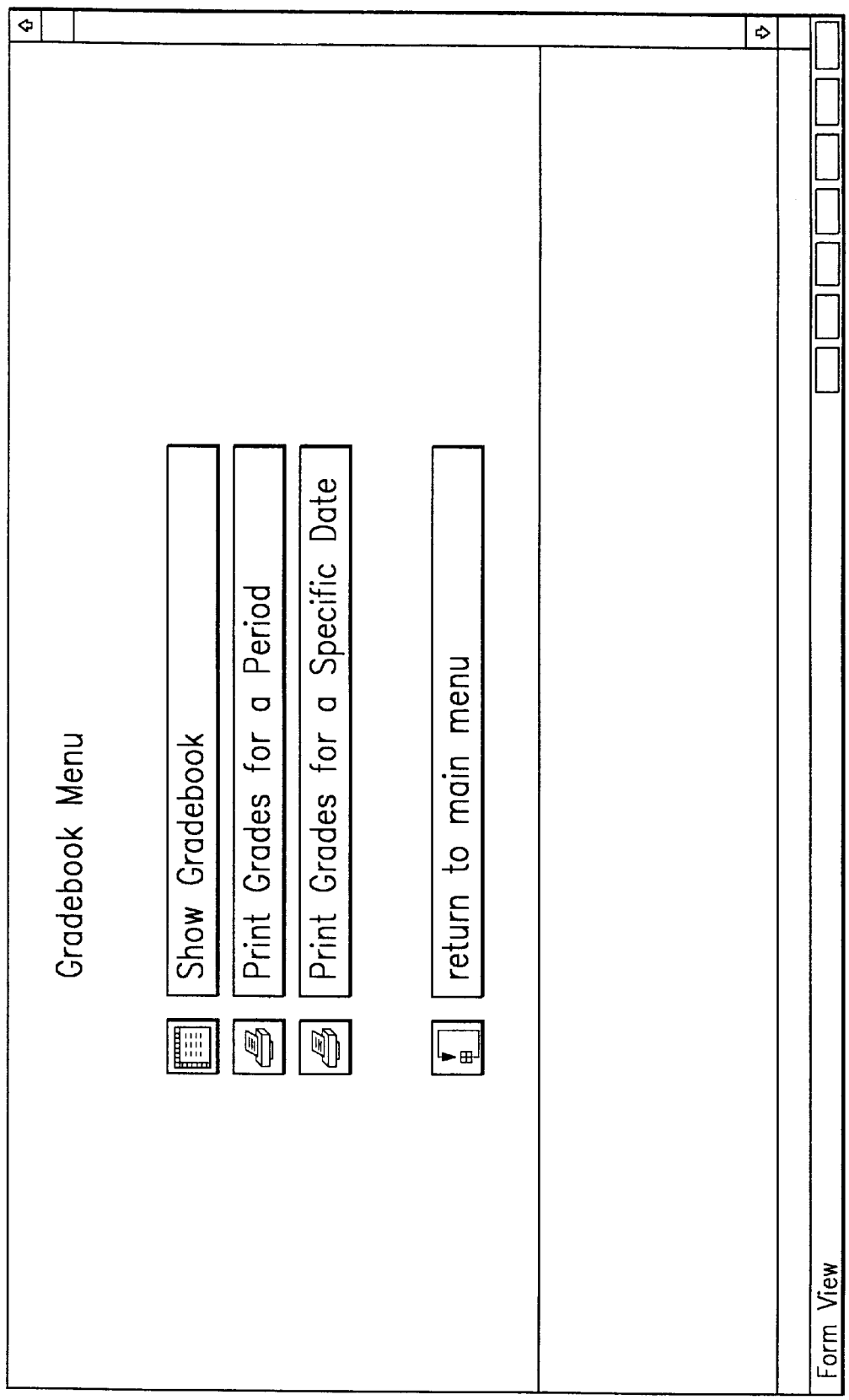

FIG. 15 illustrates a gradebook menu screen which allows the teacher to easily output grades either as a hard copy or to the teacher's display. Although the screen shows two examples of ways in which grade information can be output, those skilled in the art will readily appreciate that the grade database can be queried in a number of different ways to produce different reports. One exemplary report is illustrated as FIG. 16. In this screen, the students are alphabetized and their scores and progress through each lesson segment is both graphically and numerically portrayed so that a teacher can use this gradebook screen to quickly determine which student or students are having problems with which particular lesson segments, i.e., by looking at the color coded indications on the screen.

Although the foregoing description has been directed to an exemplary system for implementing educational methods according to the present invention, one skilled in the art will appreciate that many other systems or variations of the system described above could readily be configured to implement an educational method according to the present invention. For example, other types of memory storage devices and communication systems linking the student workstations to the teacher workstation could be readily implemented. Methods according to the present invention are also not limited to a single group of student terminals linked to a single teacher's workstation, but could include an entire school's workstations or more.

Moreover, one skilled in the art will readily appreciate that emerging multimedia technologies and computer developments readily lend themselves to integration with various embodiments of the present invention. For example, expert systems could be used as part of the courseware so that the system develops its own questioning and remedial presentation techniques. Moreover, the advent of computer voice synthesis and recognition provides another alternative for both student input and system audio output.

The foregoing description which sets forth exemplary preferred embodiments of a novel educational method and system for carrying out such a method is merely intended to be illustrative of the present invention rather than restrictive or limitive thereof. On the other hand, the scope of the invention is set forth in the appended claims which are intended to encompass what is directly set forth therein as well as reasonable equivalents thereof including those expressly and implicitly set forth in the disclosure.

What is claimed is:

1. An administration terminal for communicating with a plurality of workstations in an educational system, said administration terminal comprising:

a display; and a user interface created on said display for changing a configuration of said educational system, said user interface including:

means for adjusting a classroom setup;

means for adjusting lessons to be presented on said workstation; and means for displaying student progress with respect to said lessons.

2. The administration terminal of claim 1, wherein said means for adjusting a classroom setup is a function selected from a group consisting of at least one of:

adding a student;

changing a student;

deleting a student;

printing a classroom list; and printing logon names.

3. The administration terminal of claim 1, wherein said means for adjusting lessons to be presented on said workstation is a function selected from a group consisting of at least one of:

setting lesson order;

setting chapter test locations;

setting lesson mastery grades;

setting maximum quiz time;

editing homework assignments; and printing lesson information.

4. The administration terminal of claim 3, wherein said setting chapter test locations function comprises:

means for selectively determining when a test will be performed relative to said lessons.

5. The administration terminal of claim 4, wherein said setting chapter test locations function further comprises:

means for excluding selected lessons from said test.

6. The administration terminal of claim 3, wherein said setting lesson mastery grades function comprises:

means for setting a threshold score, wherein said threshold score is a minimum score required to proceed to a next lesson.

7. The administration terminal of claim 6, wherein said threshold score is individually set for each test.

8. The administration terminal of claim 6, wherein said threshold score is universally set for all tests.

9. The administration terminal of claim 1, wherein said user interface also includes:

means for shutting down a classroom, wherein said means for shutting down a classroom alerts said plurality of workstations to prohibit access to additional lesson segments which are longer than a predetermined time.

10. The administration terminal of claim 1, wherein said means for displaying student progress with respect to said lessons includes means displaying said progress both graphically and numerically.

11. The administration terminal of claim 10, wherein said means for displaying said progress graphically includes color coded indications of student progress with respect to said lessons.

12. An administration terminal for communicating with a plurality of workstations in an educational system, said administration terminal including a user interface, the user interface comprising:

means for adjusting a classroom setup;

means for adjusting lessons to be presented on said workstation; and means for displaying student progress with respect to said lessons.

13. The administration terminal of claim 12, wherein said means for adjusting a classroom setup is a function selected from a group consisting of at least one of:

adding a student;

changing a student;

deleting a student;

printing a classroom list; and printing logon names.

14. The administration terminal of claim 12, wherein said means for adjusting lessons to be presented on said workstation is a function selected from a group consisting of at least one of:

setting lesson order;

setting chapter test locations;

setting lesson mastery grades;

setting maximum quiz time;

editing homework assignments; and printing lesson information.

15. A master workstation which communicates with a plurality of slave workstations in an educational system, said master workstation includes a user interface for controlling said slave workstations, said user interface for selecting at least one function, wherein the at least one function comprises:

a classroom setup function;

a lesson setup function; and a student progress function.

16. The master workstation of claim 15, wherein said classroom setup function includes a second menu comprising at least one function selected from a group consisting of:

an add student function;

a change student function;

a delete student function;

a print classroom list function; and a print logon names function.

17. The master workstation of claim 15, wherein said lesson setup function includes a third menu comprising at least one function selected from a group consisting of:

a set lesson order function;

a set chapter test locations function;

a set lesson mastery grades function;

a set maximum quiz time function;

an edit homework assignments function; and a print lesson information function.

18. The master workstation of claim 17, wherein said edit homework assignments function includes an editor screen, the editor screen includes a field selected from the group of fields consisting of:

a pretest assignment field;

a lesson assignment field;

a review assignment field;

a quiz assignment field; and a final assignment field.

19. The master workstation of claim 15, wherein the at least one function further comprises:

a check homework function; and a classroom shutdown function.

20. In an administration terminal which communicates with a plurality of workstations in an educational system, a method for changing a configuration of said educational system via a user interface, wherein said user interface is created on a display in said administration terminal, the method comprising the steps of:

adjusting a classroom setup;

adjusting lessons to be presented on said workstation; and displaying student progress with respect to said lessons.

21. The method of claim 20, wherein said step of adjusting a classroom setup is a step selected from a group consisting of at least one of:

adding a student;

changing a student;

deleting a student;

printing a classroom list; and printing logon names.

22. The method of claim 20, wherein said step of adjusting lessons to be presented on said workstation is a step selected from a group consisting of at least one of:

setting lesson order;

setting chapter test locations;

setting lesson mastery grades;

setting maximum quiz time;

editing homework assignments; and printing lesson information.

23. The method of claim 22, wherein said step of setting chapter test locations comprises the step of:

selectively determining when a test will be performed relative to said lessons.

24. The method of claim 23, wherein said step of setting chapter test locations further comprises the step of:

excluding selected lessons from said test.

25. The method of claim 22, wherein said step of setting lesson mastery grades comprises the step of:

setting a threshold score, wherein said threshold score is a minimum score required to proceed to a next lesson.

26. The method of claim 25, wherein said threshold score is individually set for each test.

27. The method of claim 25, wherein said threshold score is universally set for all tests.

28. The method of claim 20, further comprising the step of:

shutting down a classroom, wherein said step of shutting down a classroom alerts said plurality of workstations to prohibit access to additional lesson segments which are longer than a predetermined time.

29. The method of claim 20, wherein said step of displaying student progress with respect to said lessons includes the step of:

displaying said progress both graphically and numerically.

30. The method of claim 29, wherein said step of displaying said progress graphically includes color coded indications of student progress with respect to said lessons.

* * * * *